No. 893,787. PATENTED JULY 21, 1908.
E. J. CONKLIN.
FRICTION DRIVE CHAIN.
APPLICATION FILED JUNE 28, 1907.
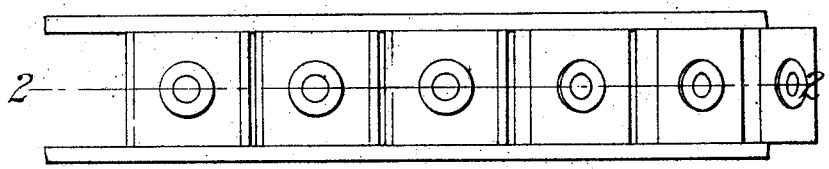
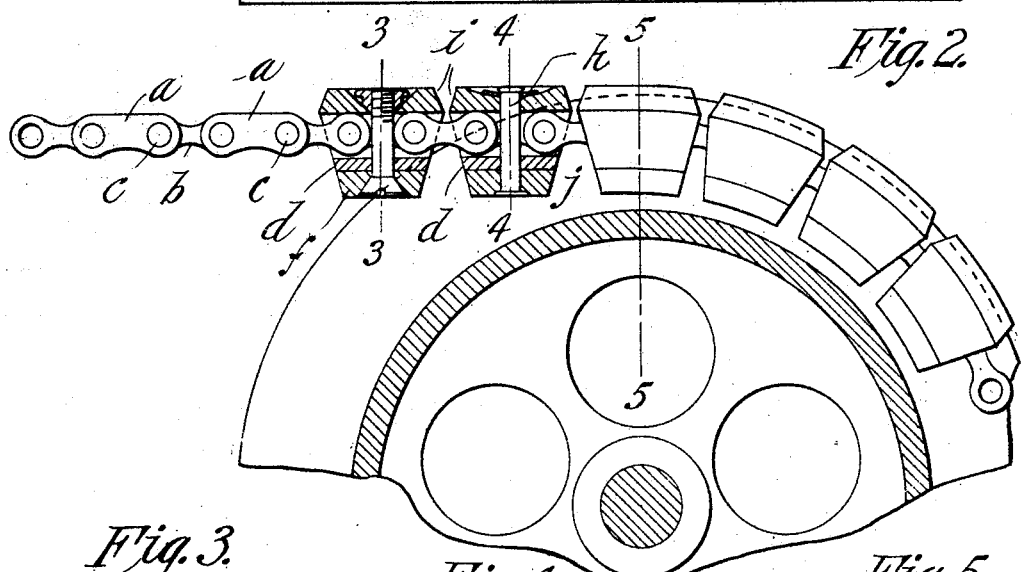
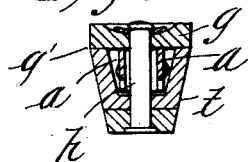
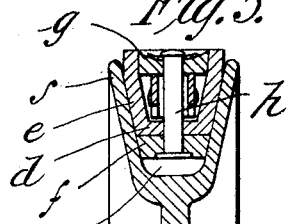
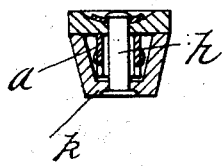
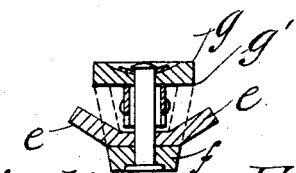
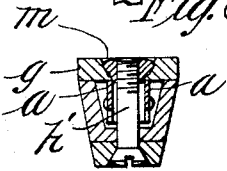
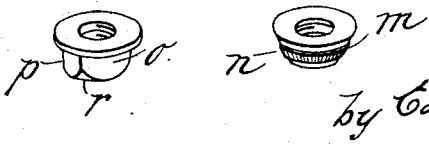
Witnesses:
H. L. Sprague
H. J. Craig
Inventor:
Edward J. Conklin
by Chapin & Co.
Attorneys.

UNITED STATES PATENT OFFICE.

EDWARD J. CONKLIN, OF WALDEN, NEW YORK, ASSIGNOR, BY MESNE ASSIGNMENTS, TO WHITNEY MANUFACTURING COMPANY, OF HARTFORD, CONNECTICUT, A CORPORATION.

FRICTION DRIVE-CHAIN.

No. 893,787.  Specification of Letters Patent.  Patented July 21, 1908.

Application filed June 28, 1907. Serial No. 381,187.

*To all whom it may concern:*

Be it known that I, EDWARD J. CONKLIN, a citizen of the United States of America, residing at Walden, in the county of Orange and State of New York, have invented new and useful Improvements in Friction Drive-Chains, of which the following is a specification.

This invention relates to improvements in covering for drive-chains or link-belts, and especially to the class which employs leather for the wearing faces, or some analogous material, in order to lessen the noise while in operation, and also to increase the frictional bearing surface between the belt and the pulley.

In the drawings forming part of this application:—Figure 1 is a plan view of the finished chain as applied to a pulley which has a groove for receiving the same. Fig. 2 is a longitudinal sectional view on the line 2—2, Fig. 1. Fig. 3 is a transverse section on the line 3—3, Fig. 2, in which the bolt is provided with a thread at one end for receiving a nut in order that the pieces may be drawn together and secured to the links of the chain. This view represents the point at which the belt is to be separated when placing the same on the pulley. Fig. 4 is a transverse section on line 4—4, Fig. 2 in which the rivet for securing the pieces together is shown. Fig. 5 is a transverse section on line 5—5, Fig. 2 of a modification showing the completed belt in place and in the groove of the pulley. Fig. 6 is a modification in which only a single piece of leather is used for covering the inside and side portions of the chain. Fig. 7 shows the position of the inclosing side pieces for the links before the same are bent inward against the plates of the chain. Fig. 8 is a transverse sectional view similar to Fig. 3 but showing a different form of nut and provided with a knurled edge so that the same is prevented from loosening after being secured in place on the bolt. Fig. 9 is a detailed view of this nut. Fig. 10 is a detailed view of a modified form of nut for securing the bolt and so shaped as to prevent working loose when in place. Reference to Fig. 3 will show this form of nut in place.

Referring to the drawings in detail, $a$ designates the side-plates of the drive-chain, and $b$ the blocks thereof that are secured to the plates $a$ by means of the usual rivets $c$.

$d$ designates a piece or block of leather that is placed on the inside of the chain in contact with the side-plates $a$, having the laterally projecting wing portions $e$, as shown in Fig. 7, extending from opposite sides of the chain.

$f$ designates a second piece or block of leather that is placed below and in contact with the piece $d$.

$g$ designates a third piece or block of leather, rectangular in cross section and placed on the upper side of the plates $a$. The length of the wing pieces $e$ is such that when folded inward toward the plates, they will lie under the piece $g$, the outer surface of the wing being flush with the outer edge of the plates of the pieces $g$, as clearly shown in Figs. 3, 4, and 8, as shown at $g^1$. A rivet $h$ extends through the pieces $f$, $d$, and $g$ and through the opening in the chain between the blocks $b$ whereby the pieces or blocks of leather are firmly secured to the chain.

By referring to Fig. 2 it will be seen that the ends of the pieces $f$, $d$, and $g$ in sectional elevation, are inclined from each other so that spaces $i$ and $j$ are formed between each link in order that the chain may bend during its engagement with the curved surface of the pulley.

In the form of covering for the chain shown in Figs. 2, 3, 4, 5, 7, and 8, I employ two thicknesses, as $d$ and $f$, on the inside of the chain, while in Fig. 6, which is a modified form, only one thickness of covering is shown and it is designated by the letter $k$. This piece is bent inward towards, and in contact with the sides of the plates $a$ in the same manner as that above described, and the rivet $h$ is passed between the plates $a$ and through the covering $k$. This form of covering is the same as that described above, except that the piece $f$ is omitted.

In Fig. 5, the wing portions $e$ of the piece $d$, instead of engaging the under side of the block $g$ of leather or being pressed beneath the piece $g$ are extended flush with the top or outer surface of the block $g$, as clearly indicated.

In order to fasten the ends of the chain together firmly and at the same time permit easy separation, I employ a nut $m$ (shown in detail in Fig. 9) which is provided with a conical side and a knurled surface $n$ whereby when the bolt $h^1$ is screwed into the nut and drawn into the piece $g$, flush with the upper surface, as shown in Fig. 8, there is no danger of the nut working loose and becoming detached from the bolt since the knurled surface n of the nut will embed itself in the leather. The bolt can not become lost or detached on account of its head end bearing against the bottom of the groove in the pulley.

Fig. 10 shows a modified construction of the form of nut for the bolt $h^1$ which is designated by the letter o. This nut is provided with the vertical sides p and the chamfered edge r so that when the bolt h is rotated and the nut drawn into the leather piece g flush with the outer surface thereof, there is no danger of the bolt becoming loosened by the unthreading of the nut therefrom.

The transverse section of the pulley shown in Fig. 5, is provided with inclined flanges s, the inclination of which practically corresponds with the inclination of the sides t of the finished belt.

The groove formed between the flanges s is made deep enough so that the heads of the rivets h will not strike the bottom, and is designated by the letter u.

What I claim, is:—

1. A drive-chain comprising blocks and plates and a casing therefor comprising a series of pieces secured to the inner surface of the blocks and plates of said chain, and a second series of pieces secured to the outer surface of the same, the first series of pieces being bent inward against the sides of the chain and into contact with the second series of pieces, and means for securing said pieces to the blocks and plates of the chain, as described.

2. A drive-chain comprising blocks and plates and a covering therefor comprising blocks of leather secured to the inner and outer portions of the blocks and plates of the chain, the blocks of leather on the inner surface of the chain being bent against the sides of the chain and into contact with the blocks of leather on the outer surface of the chain, the sides of the covering being inclined.

3. A drive-chain comprising blocks and plates and a covering therefor comprising pieces of leather secured to the inner and outer surfaces of the blocks and plates of the chain, one set of pieces engaging the inner and side portions of the chain, another set of pieces engaging the outer surface of the chain and the first mentioned set of pieces, and a third set of pieces secured to the inner surface of the first mentioned pieces, and means for securing said pieces to the individual blocks and plates comprising the chain, as described.

EDWARD J. CONKLIN.

Witnesses:
 CYRUS B. FOWLER,
 W. J. BELCHER.